(12) United States Patent
Meyer et al.

(10) Patent No.: US 9,267,281 B2
(45) Date of Patent: Feb. 23, 2016

(54) BACKLIT FALSE WALL HAVING AN AFTERGLOW

(75) Inventors: Yves Meyer, Rexheim (FR); Jean-Marc Scherrer, Riedisheim (FR)

(73) Assignee: NORMALU, Kembs (FR)

( * ) Notice: Subject to any disclaimer, the term of this patent is extended or adjusted under 35 U.S.C. 154(b) by 561 days.

(21) Appl. No.: 13/505,018

(22) PCT Filed: Oct. 29, 2010

(86) PCT No.: PCT/FR2010/000717
§ 371 (c)(1),
(2), (4) Date: Aug. 7, 2012

(87) PCT Pub. No.: WO2011/051579
PCT Pub. Date: May 5, 2011

(65) Prior Publication Data
US 2012/0293984 A1    Nov. 22, 2012

(30) Foreign Application Priority Data

Oct. 30, 2009   (FR) ...................................... 09 05232

(51) Int. Cl.
*F21V 9/16*     (2006.01)
*E04B 9/30*    (2006.01)
*C09D 5/22*    (2006.01)
(Continued)

(52) U.S. Cl.
CPC .  *E04B 9/303* (2013.01); *C09D 5/22* (2013.01);
*E04B 9/32* (2013.01); *E04F 13/005* (2013.01);
*E04F 19/02* (2013.01); *F21V 9/16* (2013.01);
*F21V 33/006* (2013.01); *E04B 2009/0492*
(2013.01); *F21V 1/14* (2013.01); *F21V 17/107*
(2013.01); *F21Y 2113/00* (2013.01)

(58) Field of Classification Search
CPC ....... C09D 5/22; F21Y 2113/02; E04B 9/303; E04B 2009/0492
USPC ........... 362/84, 601, 606, 615–619, 621–624, 362/20, 147
See application file for complete search history.

(56) References Cited

U.S. PATENT DOCUMENTS 3,460,299 A  *  8/1969  Wilson ............................ 52/144
3,760,178 A  *  9/1973  Miller ........................... 362/223
(Continued)

FOREIGN PATENT DOCUMENTS

DE        102 53 343 A1    5/2004
FR        2 308 155 A1    11/1976
(Continued)

OTHER PUBLICATIONS

International Search Report, dated Jul. 14, 2011, from corresponding PCT application.

*Primary Examiner* — Peggy Neils
(74) *Attorney, Agent, or Firm* — Young & Thompson

(57) ABSTRACT

A false wall (7) is backlit by a plurality of light sources (6) positioned behind same and including at least one taut translucent flexible sheet (8) anchored via the borders thereof, which are provided with elements (9) for anchoring to a frame (10), the frame (10) including a wall rail (13) having headed profiles and including receiving members (14) capable of engaging with the anchoring elements (9) in order to hold the taut translucent flexible sheet (8). The wall rail (13) includes lighting elements (15) which are invisible when the light sources (6) are operating, and which provide an afterglow when the light sources (6) are no longer operating.

5 Claims, 1 Drawing Sheet

(51) Int. Cl.
  *E04B 9/32* (2006.01)
  *E04F 13/00* (2006.01)
  *E04F 19/02* (2006.01)
  *F21V 33/00* (2006.01)
  *E04B 9/04* (2006.01)
  *F21V 1/14* (2006.01)
  *F21V 17/10* (2006.01)
  *F21Y 113/00* (2006.01)

(56) References Cited

U.S. PATENT DOCUMENTS

| | | | | |
|---|---|---|---|---|
| 5,282,117 A | * | 1/1994 | Fritts | 362/223 |
| 5,757,111 A | * | 5/1998 | Sato | 313/111 |
| 6,364,498 B1 | * | 4/2002 | Burbank | 362/84 |
| 6,843,010 B2 | * | 1/2005 | Robinson et al. | 40/571 |
| 7,412,790 B2 | * | 8/2008 | Riopel et al. | 40/546 |
| 7,685,786 B2 | * | 3/2010 | Cousin | 52/506.06 |
| 7,713,590 B2 | * | 5/2010 | Landry et al. | 427/470 |
| 7,980,719 B2 | * | 7/2011 | Harris | 362/103 |
| 2005/0157498 A1 | * | 7/2005 | Dicken | 362/277 |
| 2005/0201078 A1 | * | 9/2005 | Hannington | 362/34 |
| 2006/0096141 A1 | * | 5/2006 | Presley et al. | 40/570 |
| 2007/0051923 A1 | * | 3/2007 | Jones | 252/301.36 |
| 2007/0230166 A1 | * | 10/2007 | Gelbert | 362/145 |
| 2008/0151558 A1 | * | 6/2008 | Meyer | 362/367 |

FOREIGN PATENT DOCUMENTS

| | | | | |
|---|---|---|---|---|
| FR | 2 868 449 A1 | | 10/2005 | |
| WO | WO2010/035176 | * | 4/2010 | F21V 9/16 |

* cited by examiner

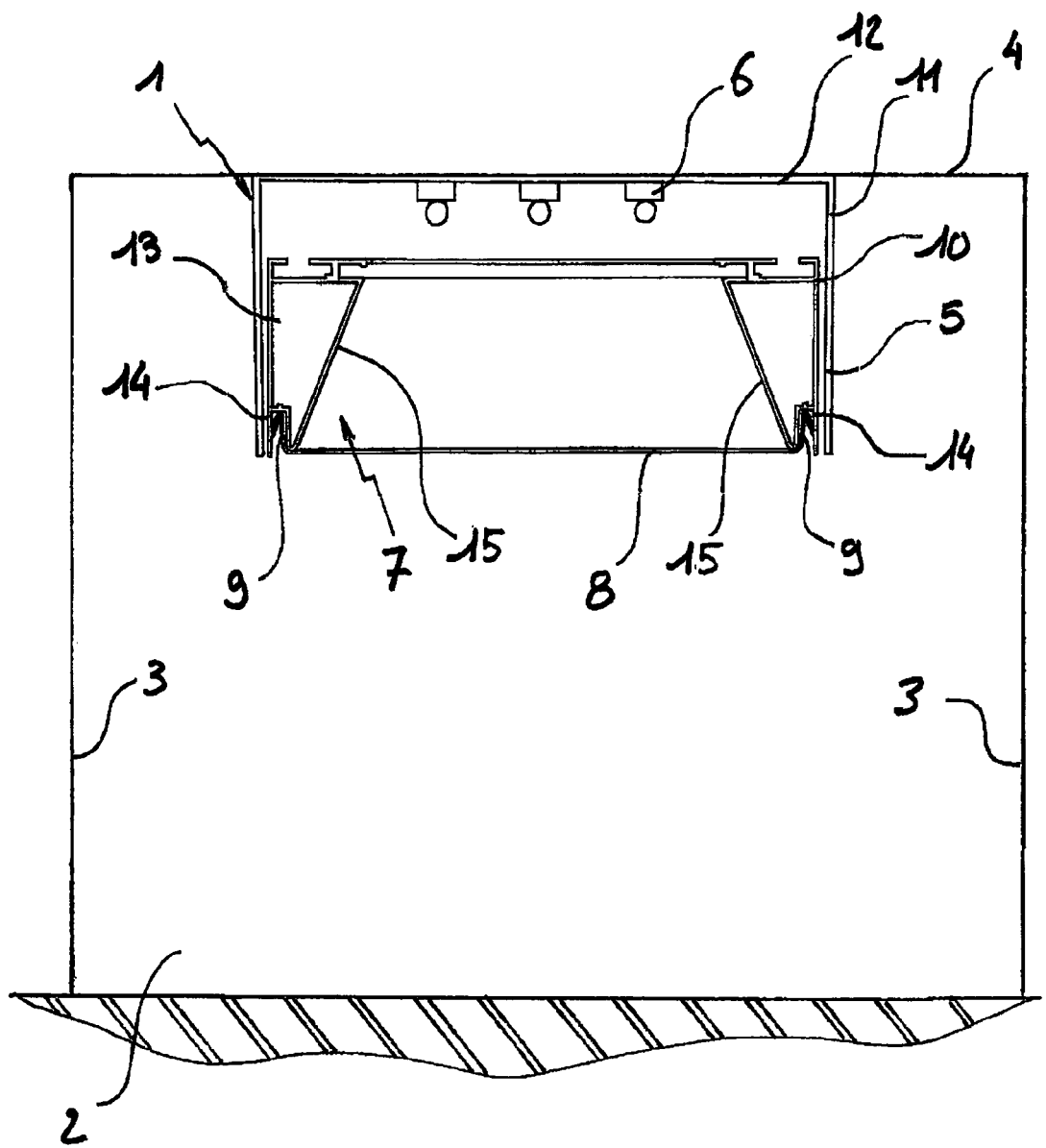

BACKLIT FALSE WALL HAVING AN AFTERGLOW

BACKGROUND OF THE INVENTION

This invention relates to a false wall backlit by light sources, preferably a false ceiling, that can also be used for a light box, which makes it possible to compensate for an intentional or unintentional extinguishing of said light sources.

DESCRIPTION OF THE RELATED ART

The false walls, in particular the false ceilings, conventionally comprise one or more hanging stringers that are attached to each of the walls and/or ceilings of a room, and a flexible and generally opaque sheet, which is deformed by tension so that its edges, equipped with hanging means, can be attached to said stringers by these hanging means, taking care to stretch the fabric tight in order to present an attractive appearance. This fabric is thus stretched parallel to a wall of the room so as to leave a residual space located between the wall of said room and said fabric. This residual space, also called the canopy, makes it possible to house all of the unsightly equipment such as electrical cables, pipes, etc. Consequently, said fabric makes it possible to conceal this equipment, but also the imperfections on the walls of the room, and to have a clean and uniform visible surface, holding the dust, in particular, in this canopy.

However, if it is desired to backlight the room, since light sources obviously cannot be attached to the flexible fabric, it is therefore necessary to install light sources inside the canopy using a translucent fabric in such a way that the light rays can illuminate the room, or provide a number of light boxes that can be integrated into a wall or a false wall and that contain a number of light sources intended to backlight a false wall that covers at least the lower, horizontal, open face of said light boxes.

The main drawback of this type of lighting is that the light sources are the fluorescent tube type powered by the local electrical network and that in the event of a power cutoff that may or may not be intentional, the room is no longer illuminated, which can be detrimental in the event of a disaster, in particular, such as a fire.

Furthermore, the fabric of the false wall can be printed with designs and backlit for aesthetic, decorative and/or advertising purposes. In the event the light sources are extinguished, the desired effect is obviously less visible or even not at all visible.

Naturally, so-called emergency, reserve, or even guide lighting is known that activates itself when the main light sources go out, but the latter are often visible and not very aesthetically pleasing, and involve major additional installation expenses, because they require installation of a second electrical circuit generally powered by low voltage.

SUMMARY OF THE INVENTION

The object of this invention is therefore to overcome the drawbacks cited above and to propose a false wall backlit by a number of light sources that makes it possible to compensate for an intentional extinguishing of said light sources or for untimely power cutoffs and to ensure a backlighting that makes it possible to at least partially replace the lighting of said light sources. In addition, this backlit false wall is especially simple to use and economical because it requires neither additional equipment nor electrical energy during its operation.

In this respect, this invention relates to a false wall backlit by a number of light sources placed behind it, and that comprises at least one taut, translucent, flexible sheet hung by its edges that are equipped with means for hanging on a frame, said frame consisting of a stringer formed by abutted profile sections and comprising receiving elements that can work with said hanging means to keep said translucent, flexible sheet taut, noteworthy in that the stringer comprises invisible lighting means when the light sources are operating and assuring an afterglow when the light sources are no longer operating.

According to a preferred embodiment, the lighting means comprise faces of the stringer located behind the translucent, flexible sheet, oriented at least in part opposite said translucent, flexible sheet and coated with photoluminescent paint.

Other advantages and characteristics will be more evident from the following description of an embodiment, given by way of nonlimiting example, of a light box equipped with a backlit false wall according to the invention with reference to the accompanying single FIGURE, which is a view in partial vertical section of a light box equipped with a backlit false wall according to the invention. even a backlit taut false wall.

BRIEF DESCRIPTION OF THE DRAWING FIGURE

The single drawing FIGURE illustrates the invention.

DETAILED DESCRIPTION OF THE INVENTION

On the single FIGURE, a light box 1 designed to illuminate a room 2 delimited by walls 3 and a ceiling 4, is depicted. Said light box 1 comprises a casing 5 containing a number of light sources 6 designed to backlight a false wall 7, said light sources 6 being placed behind the false wall 7. The latter consists of at least one translucent, flexible sheet 8 hung by its edges, which are equipped with means for hanging 9 on a frame 10, said frame 10 being movable, in particular, to allow access to said light sources 6 located inside the casing 5 of the light box 1.

In this respect, during operation, the frame 10 is housed in the casing 5 of the light box 1, as depicted in the single FIGURE and preferably can be swung outside of the casing 5, in particular for maintenance (position not shown).

The casing 5 is formed by sides 11 that advantageously define a quadrilateral, on which a base 12 is mounted. This casing 5 is designed to be attached to a surface, such as a wall or a ceiling, as in this example. The frame 10 consists of a stringer 13 formed by abutted profile sections, comprising receiving elements 14 that can work with said hanging means 9 of the translucent, flexible sheet 8 made taut at the bottom of said stringer 13.

The internal frame 10 is able to swing by rotating around an axis parallel to one of the sides of the light box 1. To keep the frame 10 in a closed so-called working position, the light box 1 comprises at least one closure (not shown), preferably of the latching type.

The light sources 6 are located behind the translucent sheet 8 and are advantageously neon tubes mounted on the base 12 of the casing 5. Thus, it is understood that when the light sources 6 are operating, the light radiation emitted by said light sources 6 passes through the translucent, flexible sheet 8 and illuminates the room 2 located in front of the translucent, flexible sheet 8.

Here, "in front of" and "behind" the translucent, flexible sheet 8 refer to the areas that are found on the side of the room 2 and on the side that is opposite the room respectively in relation to said translucent, flexible sheet 8. In the case of a false wall, the term "behind" will designate the area inside the canopy.

Thus with a configuration such as described above, when the light sources 6 are turned off intentionally or unintentionally, the room 2, of course, is no longer illuminated.

To overcome this drawback, the stringer 13 of the false wall 7 comprises lighting means 15 that make it possible to replace at least partially the lighting of said light sources 6, when the latter are turned off.

The lighting means 15 can, on the one hand, store the light energy emitted by the light sources 6 when they are operating and, on the other hand, restore said energy through the translucent, flexible sheet 8 of the false wall 7 toward the room 2 when the light sources 6 are no longer operating In a preferred embodiment, the lighting means 15 consist of faces of the stringer 13 that are located behind the translucent, flexible sheet 8, preferably that are oriented at least in part opposite said translucent, flexible sheet 8 and that are coated with photoluminescent paint.

It is well understood that the darker the room, the more visible the lighting means 15 are through the translucent, flexible sheet 8 from the room 2.

With such a configuration, it is well understood that the false wall 7 requires neither additional equipment nor electrical energy and is thus particularly economical and easy to use.

In addition, this false wall 7 does not adversely affect the overall appearance of the box, because its lighting means 15 are placed behind the translucent, flexible sheet 8 and thus are invisible when the light sources 6 are operating. The lighting means 15 are only visible when the light sources 6 are no longer operating, thanks to the light energy that they restore through the translucent, flexible sheet 8.

The frame 10 can be equipped with a second taut sheet, for example transparent, located behind the first translucent, flexible sheet 8 between the latter and the light sources 6, without going outside the scope of this invention.

Likewise, it is well understood that the frame 10 can be directly attached to each of the walls 3 and/or the ceiling 4 of a room 2, so as to hold by its edges a translucent, flexible sheet 8 and thus to produce a false wall backlit by a number of light sources 6 placed behind it in the residual space located between the wall 3 and/or ceiling 4 of the room 2 and said translucent, flexible sheet 8.

Lastly, it is evident that the example of the attaching system of the backlit taut false wall 7 according to the invention that has just been described is only one particular illustration, in no case limiting the invention; it is particularly applicable for night guide lighting or even to ensure the safety of the rooms in the event of cutoffs of electricity, or even for overall decoration in very dim lighting.

The invention claimed is:

1. A light box, comprising:
    a casing (5) with sides (11) and a base (12), the casing being attachable to a wall surface or a ceiling surface;
    a light source (6) contained in the casing (5);
    a frame (10) housed in the casing (5) and comprised of a stringer (13) formed by abutted profile sections, each profile section comprising a receiving element (14), the profile sections of the stringer comprising a light means (15), and
    at least one taut, flexible translucent sheet (8) with edges hung on the receiving element (14) of each profile section forming the stringer (13) of the frame (10),
    wherein the light source (6) is located behind the translucent sheet (8) such that, when the light source (6) is operating, light radiation emitted by said light source (6) passes through the translucent sheet (8) and illuminates an area located in front of the translucent sheet (8) while said light means (15) being invisible,
    wherein the light means (15) provides an afterglow through the translucent sheet (8) when the light source (6) is no longer operating.

2. The light box (1) according to claim 1, wherein the light means (15):
    (i) stores light energy emitted by the light source (6) when the light source (6) is operating, and
    (ii) restores the stored energy through the translucent sheet (8) toward the area located in front of the translucent sheet (8) to provide the afterglow when the light source (6) is no longer operating.

3. The light box (1) according to claim 1, wherein the light source (6) is located above an uppermost part of the stringer, and behind the translucent sheet (8).

4. The light box (1) according to claim 1, wherein the light source (6) is located on the base (12) of the casing (5), above an uppermost part of the stringer, and behind the translucent sheet (8).

5. The light box according to claim 1, wherein the light means (15) is photoluminescent paint coated on faces of the stringer (13) located behind and above the translucent sheet (8) and oriented at least facing said translucent sheet (8).

\* \* \* \* \*